United States Patent
Hirth et al.

(10) Patent No.: US 12,158,094 B2
(45) Date of Patent: Dec. 3, 2024

(54) EXHAUST GAS AFTERTREATMENT DEVICE

(71) Applicant: Vitesco Technologies GmbH, Regensburg (DE)

(72) Inventors: Peter Hirth, Munich (DE); Rolf Brück, Munich (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 0 days.

(21) Appl. No.: 18/013,612

(22) PCT Filed: Jun. 9, 2021

(86) PCT No.: PCT/EP2021/065421
§ 371 (c)(1),
(2) Date: Dec. 29, 2022

(87) PCT Pub. No.: WO2022/002542
PCT Pub. Date: Jan. 6, 2022

(65) Prior Publication Data
US 2023/0332528 A1    Oct. 19, 2023

(30) Foreign Application Priority Data
Jun. 30, 2020    (DE) .................... 10 2020 208 084.4

(51) Int. Cl.
*F01N 3/20*    (2006.01)
*F02B 37/18*    (2006.01)

(52) U.S. Cl.
CPC ......... *F01N 3/2026* (2013.01); *F01N 3/2013* (2013.01); *F02B 37/183* (2013.01); *F01N 2470/08* (2013.01); *F01N 2470/24* (2013.01)

(58) Field of Classification Search
CPC .. F01N 3/2013; F01N 3/2026; F01N 2470/08; F01N 2470/24; F02B 37/183
See application file for complete search history.

(56) References Cited

U.S. PATENT DOCUMENTS

| | | | |
|---|---|---|---|
| 2011/0219755 A1* | 9/2011 | Muller-Haas | F01N 13/0097 60/287 |
| 2012/0110989 A1* | 5/2012 | Laurell | F01N 3/2006 60/299 |

(Continued)

FOREIGN PATENT DOCUMENTS

| | | |
|---|---|---|
| DE | 102012212034 | 1/2013 |
| DE | 102016201557 | 6/2017 |

(Continued)

OTHER PUBLICATIONS

Office Action issued in corresponding German Patent Application No. DE 10 2020 208 084.4.

*Primary Examiner* — Audrey B. Walter
(74) *Attorney, Agent, or Firm* — Cozen O'Connor

(57) ABSTRACT

A device includes an exhaust gas turbocharger and an annular catalytic converter, which is mounted downstream of the turbocharger in the flow direction, wherein the annular catalytic converter has a first tubular flow section, a deflecting region, and a second annular flow section, wherein the tubular flow section is formed by an inner tube, and the annular flow section is formed between an outer tube, running substantially parallel to the inner tube, and the inner tube, and the deflecting region is designed to deflect the exhaust gas flow out of the tubular flow section into the annular flow section, wherein the tubular flow section of the annular catalytic converter comprises the same components as the gas outlet of the turbocharger mounted upstream in the flow direction.

12 Claims, 1 Drawing Sheet

(56) References Cited

U.S. PATENT DOCUMENTS

2012/0260639 A1* 10/2012 Bruck .................. F01N 3/28
                                                          60/311
2017/0082043 A1* 3/2017 Dudar ................. F01N 3/101

FOREIGN PATENT DOCUMENTS

| | | | |
|---|---|---|---|
| DE | 102016120846 | 5/2018 | |
| DE | 102017201468 | 8/2018 | |
| DE | 102017201468 A1 * | 8/2018 | |
| DE | 102017222235 | 6/2019 | |
| DE | 102018129130 | 5/2020 | |
| DE | 102018129130 A1 * | 5/2020 | ........... F01D 17/105 |
| DE | 102019210328 | 1/2021 | |
| EP | 3406873 | 11/2018 | |
| EP | 3406873 A1 * | 11/2018 | ........... F01N 13/009 |
| WO | WO-2008062916 A1 * | 5/2008 | ......... F01N 13/0097 |

\* cited by examiner

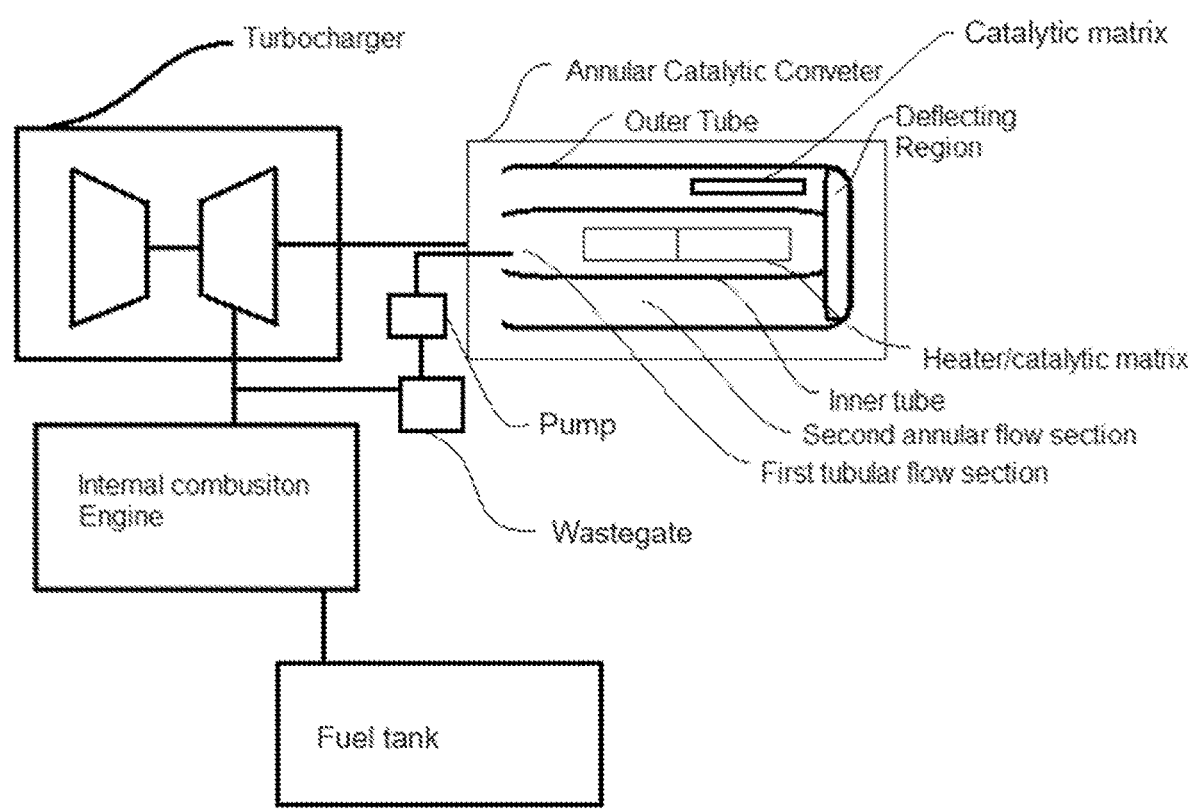

EXHAUST GAS AFTERTREATMENT DEVICE

CROSS REFERENCE TO RELATED APPLICATIONS

This is a U.S. national stage of Application No. PCT/EP2021/065421 filed Jun. 9, 2021. Priority is claimed on German Application No. DE 10 2020 208 084.4 filed Jun. 30, 2020 the content of which is incorporated herein by reference.

BACKGROUND OF THE INVENTION

1. Field of the Invention

The disclosure relates to a device comprising an exhaust gas turbocharger and an annular catalytic converter mounted downstream of the turbocharger in the flow direction, wherein the annular catalytic converter has a first tubular flow section, a deflecting region, and a second annular flow section, wherein the tubular flow section is formed by an inner tube, and the annular flow section is formed between an outer tube, running substantially parallel to the inner tube, and the inner tube, and the deflecting region is designed to deflect the exhaust gas flow out of the tubular flow section into the annular flow section.

2. Description of Related Art

For exhaust gas aftertreatment of exhaust gases of internal combustion engines, use is made inter alia of catalytic converters that allow a conversion of exhaust gas constituents into less harmful substances. Catalytic converters of different designs and different dimensions are known for this purpose.

Among others, the so-called annular catalytic converter is known, which has a central tubular flow path followed by a flow deflection, and then an annular flow path, wherein the tubular flow path is surrounded by the annular flow path. A relatively long flow path for the exhaust gas can thus be realized even if only a short structural length of the catalytic converter is possible. This promotes, for example, the mixing of the exhaust gas for the purpose of homogenizing the exhaust gas flow, or extends the time available for the reaction of a urea solution which has been injected into the exhaust gas stream.

In particular in configurations with an upstream turbocharger in the exhaust gas line, the flow distribution of the exhaust gas directly behind the turbocharger is not optimal. An uneven flow distribution negatively affects the conversion of the exhaust gas constituents at the catalytically active surfaces.

The exhaust gas flow can be homogenized on flowing through the central tubular flow section. Then the exhaust gas aftertreatment can be carried out in the annular flow section, in that corresponding catalytically active matrices can be inserted in this flow section.

The disadvantage with exhaust gas aftertreatment devices of this type is in particular that the exhaust gas is cooled on flowing through the tubular flow section. Thus the so-called light-off temperature, above which there is a marked conversion of exhaust gas constituents at the catalytically active matrices, is reached later, which reduces the efficacy of the exhaust gas aftertreatment, in particular on cold start.

SUMMARY OF THE INVENTION

It is therefore the object of one aspect of the present invention to provide a device that permits optimized heating of the catalytically active structures.

BRIEF DESCRIPTION OF THE DRAWINGS

The FIGURE is a schematic representation of a device having an exhaust gas turbocharger and an annular catalytic converter mounted downstream of the turbocharger.

DETAILED DESCRIPTION OF THE PRESENTLY PREFERRED EMBODIMENTS

One aspect of the invention relates to a device comprising an exhaust gas turbocharger and an annular catalytic converter which is mounted downstream of the turbocharger in the flow direction, wherein the annular catalytic converter has a first tubular flow section, a deflecting region, and a second annular flow section, wherein the tubular flow section is formed by an inner tube, and the annular flow section is formed between an outer tube, running substantially parallel to the inner tube, and the inner tube, and the deflecting region is designed to deflect the exhaust gas flow out of the tubular flow section into the annular flow section, wherein the tubular flow section of the annular catalytic converter comprises the same components as the gas outlet of the turbocharger mounted upstream in the flow direction.

The device is preferably arranged downstream of an internal combustion engine, so that the exhaust gas generated by the internal combustion engine can be conducted through the device.

The exhaust gas flowing through the turbocharger is often very turbulent, and the exhaust gas distribution is uneven over the cross-section of the exhaust gas line. The exhaust gas turbocharger may have a wastegate, which constitutes a bypass for the exhaust gas stream around the turbine of the exhaust gas turbocharger. Here, the exhaust gas is taken from the main exhaust gas line upstream of the turbine and returned to the exhaust gas line downstream of the turbine.

The turbocharger has a gas outlet through which the exhaust gas flows out of the turbocharger. Both the exhaust gas flowing through the wastegate and the exhaust gas flowing through the turbine flow through said outlet. The gas outlet in the design according to one aspect of the invention is formed by the tubular flow section of the annular catalytic converter mounted downstream of the turbocharger. The annular catalytic converter may thus be arranged very close behind the turbocharger, whereby the heat loss of the flowing exhaust gas up to the catalytically active structures may be minimized.

It is particularly advantageous if the annular flow section has at least one catalytically active matrix. A catalytically active matrix is preferably formed by a metallic matrix with a plurality of flow channels through which gas can flow in a main through-flow direction. Matrices of this type are preferably made by winding of a stack of layers of metallic film which are at least partially structured. Such a matrix forms a honeycomb body. Honeycomb bodies of this type are known in a wide variety of variants in the prior art. In particular, the cell density, the length and the structure of the individual flow channels can be adapted as required.

Depending on the intended application, several honeycomb bodies may be arranged in the annular flow section.

It is also advantageous if the device comprises a heating device. A heating device is in particular an electrical heater which generates heat using Ohmic resistance. For example, a medium such as the exhaust gas may here be heated and then transmit the thermal energy to the matrix. The heating device may for example be formed by a heating coil arranged in the exhaust gas stream. The heating device may be operated independently of the operating state of the internal combustion engine, so that heating can take place even when the internal combustion engine is switched off, e.g. before a cold start. The heating device may be also be arranged directly in or on the catalytically active structure in order to allow faster heating thereof.

A preferred aspect of the invention is characterized in that the heating device is formed by an electrically heatable catalytic converter. An electrically heatable catalytic converter is distinguished in particular by a honeycomb body through which gas may flow, and which can be heated by the application of an electrical voltage. Such a honeycomb body may itself also be catalytically active, for example by appropriate coating of the honeycomb body. Such a heating disc formed by a metallic honeycomb body is preferably arranged directly next to the matrix or matrices of the main catalytic converter and thus leads to rapid heating of the latter. A heating disc may for example be annular and also arranged in the annular flow section. The annular heating disc may preferably be arranged downstream or upstream of the main catalytic converter. In an alternative embodiment, the heating disc may also be arranged in the central tubular flow section.

It is also preferred if the heating device can be activated when the internal combustion engine is switched off. This is particularly advantageous so that the catalytic converter can be preheated before the engine actually starts. This may ensure that the catalytically active structures reach, as quickly as possible, their so-called light-off temperature, above which catalytic conversion of exhaust gases becomes possible. This leads in particular to reaching the legally prescribed emission values more quickly after a cold start. Also, and in particular with hybrid vehicles, this is important since here longer operating times with inactive engine are to be expected, for example with purely electric operation, so that preheating of the exhaust gas line and in particular the catalytically active structures is particularly advantageous.

In addition, it is advantageous if the heating device is arranged in the region of the turbocharger wastegate. The turbocharger wastegate is in practice formed by one or more bypasses that run from a junction point upstream of the turbine of the turbocharger to a junction point downstream of the turbine. Opening the wastegate thus allows exhaust gas to bypass the turbine. Preferably, the heating device is arranged on or in the wastegate bypass, such that the exhaust gas flowing through the wastegate passes over this and is thus heated when the heating device is active.

It is furthermore advantageous if the heating device heats a gaseous medium that can be conveyed from the heating device through at least part regions of the device. This is advantageous for achieving an optimal heat transport from the heating device to the catalytically active structures. Except in the case in which a heating device is in direct, thermally conductive contact with the catalytically active structure, a heat transfer medium is required. If the internal combustion engine is in operation, the medium used for heat transport can preferably be the exhaust gas. If the internal combustion engine is inactive, the use of another medium is necessary to ensure effective heating.

It is also suitable if the gaseous heatable medium is an air volume saturated with fuel vapour. It is furthermore suitable if the gas volume used to transport thermal energy from the heating device to the catalytic structure is formed by an air volume from a fuel tank.

Since the exhaust gas can only be used as a transport medium when the internal combustion engine is in operation, it is necessary to use an alternative medium to be able to ensure heating of the catalytically active structure before the internal combustion engine is started. For this, preferably, a proportion of air originating from the fuel tank of the internal combustion engine may be used. With the air volume saturated with fuel vapour, it is particularly advantageous that the hydrocarbons contained in the air volume are favorable for reaching the light-off temperature at the catalytically active structure.

A further advantage of the saturated air mixture from the fuel tank is that the fuel tank may have its own heating devices, in order for example to avoid freezing of the fuel or to preheat the fuel in targeted fashion. When such heating is present, the air mixture may accordingly already have a higher temperature than the ambient air.

Pre-tempered air with a high proportion of hydrocarbons is thus optimally suited for transmitting the heat from a heating device to the catalytically active structures.

In addition, it is advantageous if a pumping device is provided via which a gas stream can be conveyed through the wastegate along the tubular flow section and deflecting region into the annular flow section.

A pumping device may in particular be a pre-existing pump, such as for example a purge pump for purging the fuel tank. Alternatively, an additional pump may be provided which allows the gas stream to be conveyed from the heating device to the catalytically active structures. Furthermore, a pre-existing secondary air pump may be used.

In an alternative embodiment, the heating device may also be arranged at another point outside the device, and the gas stream for heat transport can be conveyed directly into the region of the catalytic active structures via an additional line.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A device comprising:
   an exhaust gas turbocharger;
   an annular catalytic converter which is mounted downstream of the exhaust gas turbocharger in a flow direction, wherein the annular catalytic converter has:
   a first tubular flow section formed by an inner tube, configured as an input to the annular catalytic converter and arranged at a first longitudinal end of the annular catalytic converter;
   a second annular flow section formed between an outer tube, running substantially parallel to the inner tube;

a deflecting region configured to deflect an exhaust gas flow out of the first tubular flow section into the second annular flow section; and a heater configured as a heating disc formed by a honeycomb body and arranged in the inner tube;

wherein the first tubular flow section of the annular catalytic converter forms a gas outlet of the exhaust gas turbocharger mounted upstream in the flow direction.

2. The device as claimed in claim 1, wherein the second annular flow section comprises at least one catalytically active matrix.

3. The device as claimed in claim 1, wherein the heater is an electrically heatable catalytic converter.

4. The device as claimed in claim 1, wherein the heater is activatable when an internal combustion engine is switched off.

5. The device as claimed in claim 1, wherein a gas volume used to transport thermal energy from the heater to the annular catalytic converter is formed by an air volume from a fuel tank.

6. The device as claimed in claim 1, wherein the heater is arranged directly next to a catalytic matrix.

7. The device as claimed in claim 1, wherein an additional heater is arranged in the second annular flow section.

8. The device as claimed in claim 1, wherein the heater is catalytically active.

9. The device as claimed in claim 1, wherein the heater is arranged in a region of a wastegate of the exhaust gas turbocharger.

10. The device as claimed in claim 9, wherein a pump is provided via which a gas stream can be conveyed through the wastegate along the first tubular flow section and deflecting region into the second annular flow section.

11. The device as claimed in claim 1, wherein the heater is configured to heat a gaseous medium conveyed from the heater through at least part regions of the device.

12. The device as claimed in claim 11, wherein the gaseous medium is an air volume saturated with fuel vapour drawn from air volume in a fuel tank.

* * * * *